United States Patent
Sayers et al.

(10) Patent No.: US 10,552,975 B2
(45) Date of Patent: Feb. 4, 2020

(54) RANKING TARGET DIMENSIONS

(71) Applicant: Hewlett-Packard Development Company, L.P., Houston, TX (US)

(72) Inventors: Craig Peter Sayers, Menlo Park, CA (US); Prakash Reddy, Fremont, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,010

(22) PCT Filed: Jan. 14, 2016

(86) PCT No.: PCT/US2016/013412
§ 371 (c)(1),
(2) Date: Mar. 23, 2018

(87) PCT Pub. No.: WO2017/123230
PCT Pub. Date: Jul. 20, 2017

(65) Prior Publication Data
US 2018/0293750 A1    Oct. 11, 2018

(51) Int. Cl.
*G06T 7/60*        (2017.01)
*G06T 17/00*       (2006.01)
(Continued)

(52) U.S. Cl.
CPC .......... *G06T 7/60* (2013.01); *G06T 7/70* (2017.01); *G06T 17/00* (2013.01); *G06T 19/20* (2013.01); *G06T 2200/08* (2013.01); *G06T 2200/24* (2013.01); *G06T 2207/10008* (2013.01); *G06T 2215/16* (2013.01)

(58) Field of Classification Search
None
See application file for complete search history.

(56) References Cited

U.S. PATENT DOCUMENTS 6,246,412 B1   6/2001   Shum et al.
8,837,026 B2   9/2014   Fisker et al.
(Continued)

FOREIGN PATENT DOCUMENTS

WO   WO-2014014524 A1   1/2014

OTHER PUBLICATIONS

Volume Graphics, "VGStudio Max 2.2" https://web.archive.org/web/20151123151726/http://www.volumegraphics.com/fileadmin/user_uploau/flyer/VGStudioMAX_22_en.pdf, 2015. (Year: 2015).*
(Continued)

*Primary Examiner* — Nicholas R Wilson
(74) *Attorney, Agent, or Firm* — Brooks Cameron & Huebsch PLLC (US LC)

(57) ABSTRACT

In one example implementation, a system for ranking target dimensions includes a model engine to generate a three-dimensional (3D) model of an object from a scan of the object, an analysis engine to analyze the 3D model of the object and determine target dimensions of the object, a ranking engine to rank the target dimensions based on target dimension characteristics, historical scan information related to the target dimension characteristics, or a combination thereof, and a display engine to display information relating to the ranked target dimensions of the object.

20 Claims, 2 Drawing Sheets

(51) Int. Cl.
  *G06T 7/70*   (2017.01)
  *G06T 19/20*  (2011.01)

(56) References Cited

U.S. PATENT DOCUMENTS

| | | |
|---|---|---|
| 9,091,535 B2 | 7/2015 | Baeg et al. |
| 2009/0284527 A1 | 11/2009 | Ofek et al. |
| 2010/0177169 A1 | 7/2010 | Saric |
| 2013/0166256 A1 | 6/2013 | Wirx-Speetjens et al. |
| 2015/0138320 A1 | 5/2015 | El Daher |

OTHER PUBLICATIONS

Brunke et al., "A new Concept for High-Speed atline and inlineCT for up to 100% Mass Production Process Control", EDP Sciences, 2013. (Year: 2013).*

Muller, Pavel, "Coordinate Metrology by Traceable Computed Tomography", University of Denmark, 2013. (Year: 2013).*

Hattab, Ammar, et al. "3D Modeling by Scanning Physical Modifications." In Graphics, Patterns and Images (SIBGRAPI), 2015 28th SIBGRAPI Conference on, pp. 25-32. IEEE, 2015.

Krainin, Michael et al. "Autonomous generation of complete 3D object models using next best view manipulation planning." In Robotics and Automation (ICRA), 2011 IEEE International Conference on, pp. 5031-5037. IEEE, 2011.

Pai, DK et al. "Scanning physical interaction behavior of 3D objects." In Proceedings of the 28th annual conference on Computer graphics and interactive techniques, pp. 87-96.

\* cited by examiner

RANKING TARGET DIMENSIONS

BACKGROUND

Three-dimensional (3D) scanning may be useful for analyzing a real world object and constructing a digital model of that object. For example, 3D scanning may be used in the entertainment industry for digital productions such as movies and video games. Additional examples may include using 3D scanning in industrial design, prototyping, and quality control applications.

DETAILED DESCRIPTION

Scan quality of three-dimensional (3D) scanners may vary between different 3D scanners. For example, some scanners may not scan objects with a desired amount of accuracy. For instance, such scanners may not accurately scan certain areas and/or features of scanned objects such as a recessed area of a scanned object.

Examples herein relate to systems, instructions, and methods of ranking target dimensions. For example, ranking target dimensions can include a model engine to generate a three-dimensional (3D) model of an object from a scan of the object, an analysis engine to analyze the 3D model of the object and determine target dimensions of the object, a ranking engine to rank the target dimensions based on target dimension characteristics, historical scan information related to the target dimension characteristics, or a combination thereof, and a display engine to display information relating to the ranked target dimensions of the object.

As used herein, a target dimension refers to a dimension of an object that may be measured by a user to supplement the 3D model of the object. A target dimension may define and/or affect other dimensions of the object. That is, a target dimension of the object may be a dimension of the object that may be important to defining a shape, size, and/or other physical characteristics of the object. For example, an object can be a cylinder where a target dimension of the cylinder may include a length and/or diameter of the cylinder.

Target dimensions may be useful in supplementing scans of objects with 3D scanners. For example, a 3D scanner may not accurately scan certain features of an object that may be target dimensions of the object. Therefore, a user may measure a target dimension of the object to supplement the 3D scan of the object.

Notably, ranking target dimensions of an object scanned with a 3D scanner can inform a user of the scanner of poorly scanned areas and/or features of the object. Additionally, ranking target dimensions can inform the user to supplement the 3D scan of the object with certain measurements of the object while comparatively reducing a number of scanned measurements utilized in forming an accurate 3D model of the object. For example, informing the user of ranked target dimensions of the 3D object to be measured and revising the 3D model after each measurement may allow for a 3D model with acceptable accuracy without measuring all of the ranked target dimensions of the 3D object, as is further described herein.

As used herein, an object may be any 3D object about which target dimensions may be determined. For example, a 3D object may be any object that may be scanned by a scanner. That is, a 3D object may be any object that has a height, width, and length as a first, second, and third dimension. As used herein, a scanner may be any device that analyzes a real-world object (e.g., a 3D object) to collect data about its shape and/or appearance. The scanner may be a device with an attached camera, reader, projector, light source, and/or other suitable devices or combinations thereof. The scanner may be used to generate and transmit a plurality of pictures of the 3D object. The system can then analyze the pictures of the 3D object, generate a 3D model of the 3D object, and determine and rank target dimensions of the 3D object to be measured, as is further described herein. The system can then display information relating to the ranked target dimensions.

Figure 1:
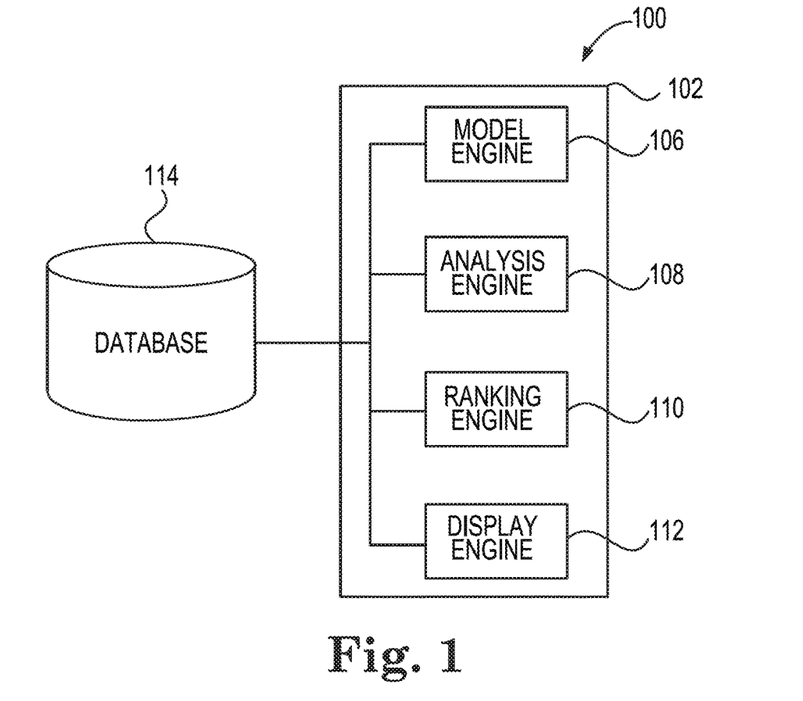
FIG. 1 illustrates a diagram of an example of a system of ranking target dimensions consistent with the disclosure.
Figure 2:
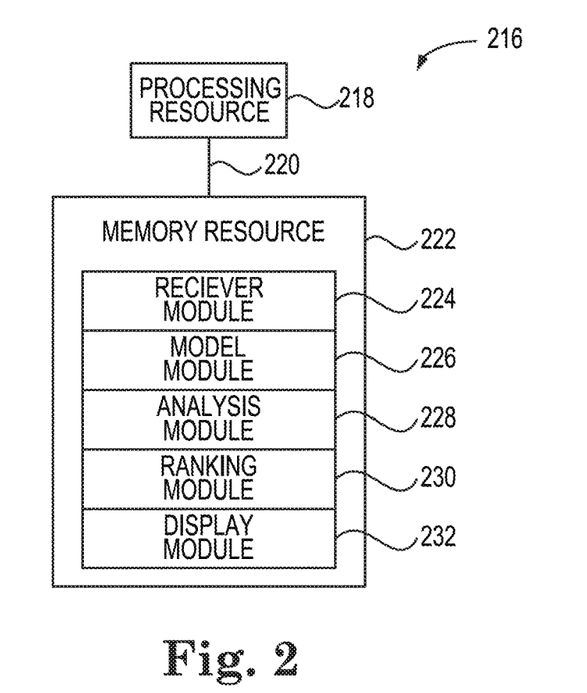
FIG. 2 illustrates a diagram of an example of a computing device consistent with the disclosure.

FIGS. 1 and 2 illustrate examples of system 100 and computing device 214 consistent with the disclosure. FIG. 1 illustrates a diagram of an example of a system 100 of ranking target dimensions consistent with the disclosure. The system 100 can include a database 114, a ranking target dimensions system 102, and/or a plurality of engines (e.g., receiver engine 104, model engine 106, analysis engine 108, ranking engine 110, display engine 112). The ranking target dimension system 102 can be in communication with the database 114 via a communication link, and can include the plurality of engines (e.g., receiver engine 104, model engine 106, analysis engine 108, ranking engine 110, display engine 112). The ranking target dimension system 102 can include additional or fewer engines that are illustrated to perform the various elements as are described in further detail in connection with FIG. 3.

The plurality of engines (e.g., receiver engine 104, model engine 106, analysis engine 108, ranking engine 110, display engine 112) can include a combination of hardware and machine readable instructions (e.g., stored in a memory resource such as a non-transitory machine readable medium) that are executable using hardware components such as a processor, but at least hardware, to perform elements described herein (e.g., generate a three-dimensional (3D) model of an object from a scan of the object, analyze the 3D model of the object and determine target dimensions of the object, rank the target dimensions based on target dimension characteristics, historical scan information related to the target dimension characteristics, or a combination thereof, and display information relating to the ranked target dimensions of the object, etc.).

The model engine 106 can include hardware and/or a combination of hardware and machine readable instructions, but at least hardware, to generate a three-dimensional (3D) model of an object from a scan of the object. For example, the model engine 106 can utilize point cloud information to generate a 3D model of the scanned object.

As used herein, a point cloud can be a set of data points in a coordinate system. For example, a point cloud can be a set of data points in a three-dimensional coordinate system (e.g., X, Y, and Z coordinates). A point cloud can represent the external surface of an object, such as a scanned object, that a device such as a 3D scanner has measured. For example, the object may be represented by a set of data points included in a point cloud or a plurality of point clouds, where the point clouds include coordinate information for the set of data points that can be used to generate the 3D model of the object.

The analysis engine 108 can include hardware and/or a combination of hardware and machine readable instructions, but at least hardware, to analyze the 3D model of the object and determine target dimensions of the object. Analyzing the 3D model of the object can include determining an object type, size, shape, and/or other characteristics of the object. Model engine 106 may utilize characteristics of the object from the 3D model such as the type, size, and/or shape to determine the target dimensions of the object. For example, the 3D model may be of an object that is comprised of two stacked cylinders. Therefore, 3D model may consist of at least nine target dimensions that may be relevant to measure, including the length and/or diameter of a first cylinder of the object, the length and/or diameter of a second cylinder of the object, the position of the midline of the first cylinder relative to the midline of the second cylinder along two axes, the orientation of the first cylinder relative to the second cylinder around two axes, as well as the total length of the object, although target dimensions of the object are not limited to the above dimensions.

Analyzing the 3D model of the 3D object may include determining characteristics of each target dimension of the object. As used herein, characteristics of a target dimension may include a determined value of the target dimension, a target dimension type, and a target dimension correction.

A target dimension value may include a value of a dimension of the target dimension. For example, a target dimension value may be the length of a cylinder of the object. That is, the length of a cylinder of the object (e.g., target dimension value) may be three inches.

A target dimension type may be a type of dimension. In some examples, a target dimension type may include "a total length of an object", "a length of a component of the object", "an angle between two components of the object", "a depth of a recess (e.g., a hole) of the object", "a wall thickness of the object", "a height of a protrusion of the object", and/or "a diameter of a cylindrical component of the object".

A target dimension type may be a specific object type. In some examples, the target dimension type may include "the width of the head of a bolt". In some examples, the target dimension type may include "the width of the head of an M4 bolt".

A target dimension correction may be a difference between a value of a dimension of the 3D model and a value of the corresponding dimension of the object. For example, the value of a diameter of a cylinder of an object may be five inches and a value of a corresponding diameter of the 3D model may be four inches; the target dimension correction is one inch.

Each target dimension characteristic may have more than one possible value, and may have an associated probability for the value. For example, there may be a 95% probability that a target dimension type is "the minimum width of a hexagon", and an 80% probability that the same target dimension is "the minimum width of the head of a bolt".

The ranking engine 110 can include hardware and/or a combination of hardware and machine readable instructions, but at least hardware, to rank the target dimensions based on target dimension characteristics, historical scan information related to the target dimension characteristics, or a combination thereof. For example, the ranking engine 110 can rank the target dimensions of the object from a highest ranking to a lowest ranking. Ranking engine 110 may determine the ranking by determining a probability that a user would want to measure the target dimension, as well as an estimated time a user would take to measure the dimension, as is described herein.

As used herein, a highest ranking of a target dimension may be a target dimension a user of the scanner would most likely want to measure to supplement the 3D model. Further, as used herein, a lowest ranking of a target dimension may be a target dimension a user of the scanner would least likely want to measure to supplement the 3D model.

Ranking engine 110 may use historical scan information related to the target dimension characteristics to rank the target dimensions. For example, where two cylinders of the object meet at approximately 90 degrees, and historical actions of users with a similar type of object positioning and/or orientation may have measured a similar angle in 1% of cases, the target dimension of the angle at which the two cylinders meet may be ranked such that a user may not be likely to measure that target dimension. As another example, historical actions of users may indicate that a diameter of a thin cylinder was measured 70% of the time and the length 10% of the time; the target dimension of the diameter of the thin cylinder may be ranked higher than the target diameter of the length of the cylinder. As a further example, historical actions of users may indicate that a depth of a hole of the object was measured 50% of the time and a diameter of the hole was measured 60% of the time; the target dimensions of the depth and the diameter of the hole may both be ranked higher relative to other target dimensions, but the target dimension of the diameter of the hole may be ranked higher than the target dimension of the depth of the hole.

In some examples where a target dimension could not be determined by the scan of the object, the indeterminate target dimension may be ranked higher among other target dimensions of the object. For example, a depth of a hole or recess of the object may not be easily and/or accurately scanned, and a target dimension of the depth may be ranked higher among the target dimensions.

In some examples, historical actions of users may indicate that the total length of an object may be measured more often than other measurements. The target dimension of the total length of the object may therefore be ranked higher than other target dimensions.

In some examples, historical scan information may include scans of other objects and historical user behavior in measuring target dimensions of the other objects. That is, historical scan information may include historical measurement information related to the target dimension characteristics. For example, ranking engine 110 may recognize the scan of a current object to be a bolt, and rank target dimensions of the current scan of the bolt based on scans of other bolts and/or past user behavior with other bolts. That is, ranking engine 110 may determine that dimensions important to a user may include the length of the bolt and the pitch of the thread of the bolt, and rank the target dimensions of the bolt such as the length and the pitch of the thread higher relative to other target dimensions based on the object. Specifically, ranking engine 110 may compute a probability that a user would want to measure the length of the bolt based on a probability that the object is a bolt and the historical scan information for which users measured the length of the bolt. Additionally, ranking engine 110 may estimate an amount of time it may take for a user to take a length measurement of the bolt by using the probability that it is a bolt as well as time taken in the past for users the measure the length of a bolt.

Ranking engine 110 may use a type of the scanned object to rank the target dimensions. Determining the type of the scanned object to rank target dimensions of the object may include using heuristics to determine the probability a user would want to measure each target dimension.

Heuristics may be based on the characteristics of each target dimension. For example, the characteristics (e.g., the value of the target dimension, the target dimension type, and/or the target dimension correction) of each target dimension may be used by heuristics to rank the target dimensions.

In some examples, a heuristic may be based on a design preference. For example, a designer may prefer to make dimensions round numbers; if a target dimension is linear and the length of an object is an integer number, then the probability a user would want to manually measure the length target dimension may be low relative to other target dimensions. As another example, if a target dimension is an orientation and an angle of orientation is an integer multiple of 5 degrees, then the probability a user would want to manually measure the orientation angle may be low relative to other target dimensions.

In some examples, a heuristic may be based on a model type. For example, based on an object type being a bolt, if a probability that an object is an M4 bolt is 90%, and if the length of the object is an integer multiple of five millimeters, then the target dimension may be ranked low relative to other target dimensions, or no measurement may be necessary.

In some examples, a heuristic may be utilized when determining a time taken for a user to make a measurement. For example, based on a user's personal experience, a heuristic may include parts with a length less than ten inches, an expected time to measure the length may be five seconds.

Although described as ranking the target dimensions of the object using target dimension characteristics and/or historical scan information related to the target dimension characteristics, examples of the disclosure are not so limited. For example, ranking engine 110 may utilize any other metric and/or characteristic to rank the target dimensions of the scanned object.

The display engine 112 can include hardware and/or a combination of hardware and machine readable instructions, but at least hardware, to display information relating to the ranked target dimensions of the object. Information relating to the ranked target dimensions of the object may include a list of the target dimensions. The list of the target dimensions may be ranked by a likelihood a user may want to measure that target dimension. For example, the target dimensions may be ranked from a highest likelihood to a lowest likelihood that the user may want to measure the target dimensions.

The display engine 112 may display information related to a comparatively highest ranked target dimension of the target dimensions. For example, display engine 112 may display the highest ranked target dimension for a user to measure. Displaying the highest ranked target dimension may include a request to a user to measure the highest ranked target dimension. For example, the request may indicate to a user to measure the highest ranked target dimension of the object.

The receiver engine 104 may receive a revised measured dimension of the object in response to receipt of a measurement of the highest ranked target dimension of the 3D object. The receiver engine 104 may receive the measurement of the highest ranked target dimension from a user measuring the highest ranked target dimension of the object. For example, in response to displaying the highest ranked target dimension and requesting a user to measure the highest ranked target dimension, receiver engine 104 may receive the measurement of the highest ranked target dimension from a measurement tool, as is further described herein.

The model engine 106 may update the 3D model of the object with a revised measured dimension of the object in response to receipt of a measurement of the comparatively highest ranked target dimension. For example, after receiving a measurement from a user of the highest ranked target dimension by receiver engine 104, the corresponding measurement of the 3D model may be updated. That is, the dimension of the 3D model corresponding to the highest ranked target dimension of the object may be updated based on the user of the scanner measuring the highest ranked target dimension of the object.

In some examples, updating the 3D model of the object may include updating dimensions of the 3D model that are similar to the highest ranked target dimension. For example, where an object has three holes that are of similar dimensions, such as diameter and/or depth, and one of the holes is the highest ranked target dimension, the model engine 106 may update the remaining two holes based on the similarity of the dimensions and/or characteristics of the three holes. Model engine 106 may update the two remaining holes automatically, or may request the user via display engine 112 for a selection to allow the two remaining holes to be updated.

The database 114 can include digital information relating to the scanned object. That is, the database 114 can be utilized to store digital representations (e.g., a 3D model) of the object. For example, the 3D model can include image data such as point cloud information. The database 114 can include the image data of the 3D model. The database 114 may further include pre-coded heuristics and historical information from previous scans, including past user behavior.

FIG. 2 illustrates a diagram of an example of a computing device 216 consistent with the disclosure. The computing device 216 can include hardware, machine readable instructions on a non-transitory machine readable medium, or a combination thereof, to perform the elements described herein.

The computing device 216 can be any combination of hardware and machine readable instructions to share information. The hardware, for example, can include a processing resource 218 and/or a memory resource 222 (e.g., computer-readable medium (CRM), machine readable medium (MRM), database, etc.). A processing resource 218, as used herein, can include any number of processors capable of executing instructions stored by a memory resource 222. Processing resource 218 may be implemented in a single device or distributed across multiple devices. The machine readable instructions (e.g., computer readable instructions (CRI)) can include instructions stored on the memory resource 222 and executable by the processing resource 218 to implement a desired element (e.g., receive, from a scanner, a scan of a three-dimensional (3D) object, generate a 3D model of the 3D object from the scan, analyze the 3D model of the 3D object to determine target dimensions of the 3D object, rank the target dimensions based on target dimension characteristics, historical scan information related to the target dimension characteristics, or a combination thereof, and display, via a user interface, information relating to the ranked target dimensions of the object, etc.).

The memory resource 222 can be in communication with a processing resource 218. A memory resource 222, as used herein, can include any number of memory components capable of storing instructions that can be executed by processing resource 218. Such memory resource 222 can be a non-transitory CRM or MRM. Memory resource 222 may be integrated in a single device or distributed across multiple devices. Further, memory resource 222 may be fully or partially integrated in the same device as processing resource 218 or it may be separate but accessible to that device and processing resource 218. Thus, it is noted that the computing device 216 may be implemented on a participant device, on a server device, on a collection of server devices, and/or a combination of the participant device and the server device.

The memory resource 222 can be in communication with the processing resource 218 via a communication link (e.g., a path) 220. The communication link 220 can be local or remote to a machine (e.g., a computing device) associated with the processing resource 218. Examples of a local communication link 220 can include an electronic bus internal to a machine (e.g., a computing device) where the memory resource 222 is one of volatile, non-volatile, fixed, and/or removable storage medium in communication with the processing resource 218 via the electronic bus.

A plurality of modules (e.g., receiver module 224, model module 226, analysis module 228, ranking module 230, display module 232) can include CRI that when executed by the processing resource 218 can perform elements. The plurality of modules (e.g., receiver module 224, model module 226, analysis module 228, ranking module 230, display module 232) can be sub-modules of other modules. For example, the receiver module 224 and the model module 226 can be sub-modules and/or contained within the same computing device. In another example, the plurality of modules (e.g., receiver module 224, model module 226, analysis module 228, ranking module 230, display module 232) can comprise individual modules at separate and distinct locations (e.g., CRM, etc.).

Each of the plurality of modules (e.g., receiver module 224, model module 226, analysis module 228, ranking module 230, display module 232) can include instructions that when executed by the processing resource 218 can function as a corresponding engine as described herein. For example, the receiver module 224 can include instructions that when executed by the processing resource 218 can function as the model engine 106. In another example, the model module 226 can include instructions that when executed by the processing resource 218 can function as the model engine 106. In another example, the analysis module 228 can include instructions that when executed by the processing resource 218 can function as the analysis engine 108. In another example, the ranking module 230 can include instructions that when executed by the processing resource 218 can function as the ranking engine 110. In another example, the display module 232 can include instructions that when executed by the processing resource 218 can function as the display engine 112.

Figure 3:
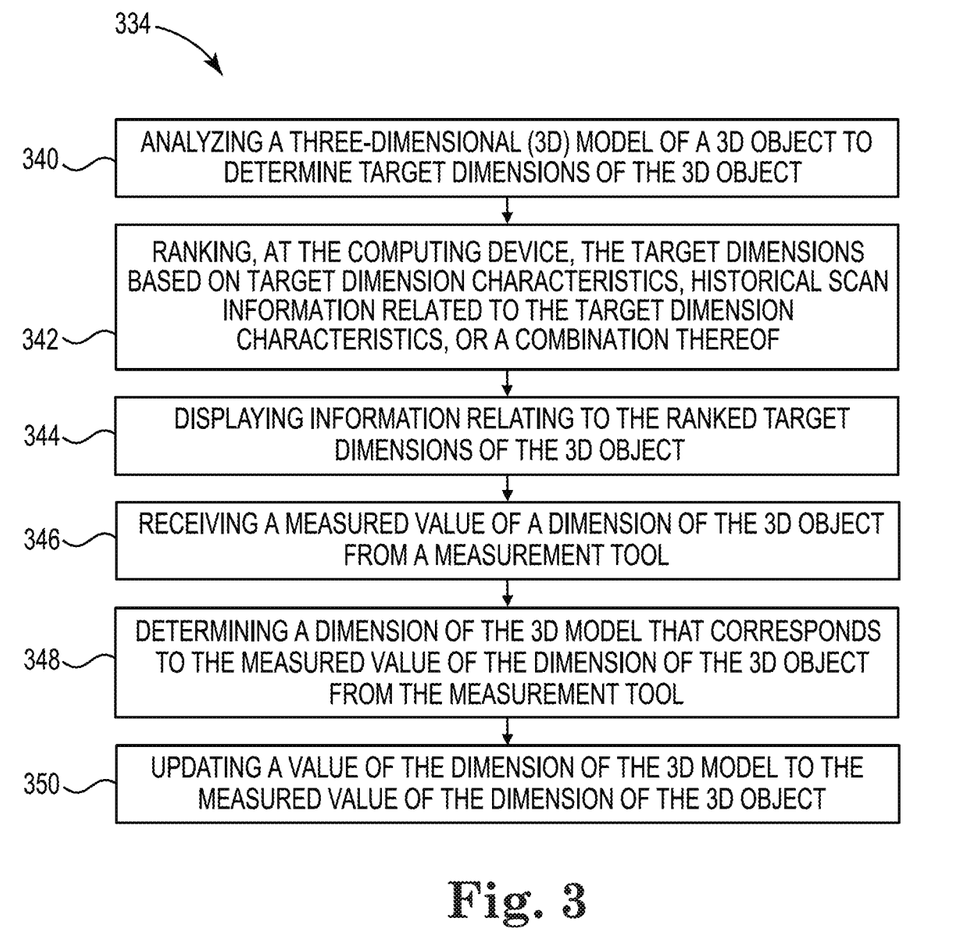
FIG. 3 illustrates a flow chart of an example of a method of ranking target dimensions consistent with the disclosure.

FIG. 3 illustrates a flow chart of an example of a method 334 of ranking target dimensions consistent with the disclosure. For example, method 334 can be performed by a computing device (e.g., computing device 216 previously described in connection with FIG. 2) to rank target dimensions.

As illustrated at 340, the method 334 can include analyzing a three-dimensional (3D) model of a 3D object to determine target dimensions of the 3D object. Analyzing the 3D model of the 3D object can include determining an object type, size, shape, and/or characteristics of the 3D object, which can be used to determine the target dimensions of the 3D object. As an example, the 3D model may be of a 3D object comprised of two stacked cylinders; the 3D model may then consist of at least nine target dimensions that may be relevant to measure, including the length and/or diameter of a first cylinder of the 3D object, the length and/or diameter of a second cylinder of the 3D object, the position of the midline of the first cylinder relative to the midline of the second cylinder along two axes, the orientation of the first cylinder relative to the second cylinder around two axes, as well as the total length of the 3D object, although the target dimensions of the 3D object are not limited to the above dimensions.

Analyzing the 3D model of the 3D object may include determining characteristics of each target dimension of the object. As used herein, characteristics of a target dimension may include a determined value of the target dimension, a target dimension type, and a target dimension correction.

A target dimension value may include a value of a dimension of the target dimension. For example, a target dimension value may be the length of a cylinder of the object. That is, the length of a cylinder of the object (e.g., target dimension value) may be three inches.

A target dimension type may be a type of dimension. In some examples, a target dimension type may include "a total length of an object", "a length of a component of the object", "an angle between two components of the object", "a depth of a recess (e.g., a hole) of the object", "a wall thickness of the object", "a height of a protrusion of the object", and/or "a diameter of a cylindrical component of the object".

A target dimension type may be a specific object type. In some examples, the target dimension type may include "the width of the head of a bolt". In some examples, the target dimension type may include "the width of the head of an M4 bolt".

A target dimension correction may be a difference between a value of a dimension of the 3D model and a value of the corresponding dimension of the object. For example, the value of a diameter of a cylinder of an object may be five inches and a value of a corresponding diameter of the 3D model may be four inches; the target dimension correct is one inch.

Each target dimension characteristic may have more than one possible value, and may have an associated probability for the value. For example, there may be a 95% probability that a target dimension type is "the minimum width of a hexagon", and an 80% probability that the same target dimension is "the minimum width of the head of a bolt".

As illustrated at 342, the method 334 can include ranking the target dimensions based on target dimension characteristics, historical scan information related to the target dimension characteristics, or a combination thereof. For example, the target dimensions of the 3D object can be ranked from a highest ranking (e.g., a target dimension a user of the scanner would most likely want to measure to supplement the 3D model) to a lowest ranking (e.g., a target dimension a user of the scanner would least likely want to measure to supplement the 3D model). Ranking engine 110 may determine the ranking by determining a probability that a user would want to measure the target dimension, as well as an estimated time a user would take to measure the dimension, as is described herein.

Ranking the target dimensions may include using historical scan information related to the target dimension characteristics. Ranking the target dimensions using historical scan information related to the target dimension characteristics may include utilizing experience with similar objects and/or object characteristics. Object characteristics can include characteristics such as object size, position, and/or orientation to rank target dimensions of the 3D object.

Historical scan information may include scans and historical target dimensions of other scanned objects of a same object type. Experience with similar or same objects and/or object characteristics may include using historical actions of users with a similar and/or same type of object. For example, as previously described in connection with FIG. 1, historical actions of users that may have measured an angle of two cylinders of an object that meet at approximately 90 degrees in only 1% of cases may indicate that a user may not be likely to measure that target dimension, and can rank that target dimension as less likely that the user would want to measure it to supplement the 3D model. As another example, historical actions of users may indicate that a diameter of a thin cylinder was measured 70% of the time and the length 10% of the time; the target dimension of the diameter of the thin cylinder may be ranked higher than the target diameter of the length of the cylinder. As a further example, historical actions of users may indicate that a depth of a hole of the object was measured 50% of the time and a diameter of the hole was measured 60% of the time; the target dimensions of the depth and diameter of the hole may both be ranked higher relative to other target dimensions, but the target dimension of the diameter of the hole may be ranked higher than the target dimension of the depth of the hole.

As described in connection with FIG. 1, ranking the target dimensions using historical scan information may additionally include ranking target dimensions that could not be determined by the scan of the 3D object as more likely that the user would want to measure it to supplement the 3D model. Ranking the target dimensions using historical scan information may further include other historical actions of users such as measuring the total length of an object more often than other measurements. The target dimension of the total length of the object may be correspondingly ranked higher than other target dimensions.

The target dimensions can be ranked by target dimension characteristics including a type of the 3D object. Determining the type of the 3D object to rank target dimensions of the 3D object may include using heuristics to determine the probability that a user would want to measure each target dimension of the 3D object.

Heuristics may be based on the characteristics of each target dimension. For example the characteristics of each target dimension may include the value of the target dimension, the target dimension type, and/or the target dimension correction. In some examples, heuristics may be based on a design preference of a designer, a type of 3D object, and/or a time taken for a user to make a measurement of the target dimension, although examples of heuristics are not so limited.

As illustrated at 344, the method 334 can include displaying information relating to the ranked target dimensions of the 3D object. Displaying information can include displaying the 3D model of the 3D object. For example, the 3D model may be displayed, as well as the list of ranked target dimensions. That is, the list of ranked target dimensions may be displayed alongside the 3D model. The list of ranked target dimensions may indicate to a user the dimensions most likely to supplement the 3D model of the 3D object based on heuristics, indeterminate target dimensions, and historical scan information.

Displaying the 3D model may also indicate to a user the areas of the 3D model that correspond to the ranked target dimensions. For example, the ranked target dimensions may be displayed on the corresponding areas of the 3D model to indicate to a user the locations of the 3D object to measure to supplement the 3D model.

Displaying the 3D model may also include displaying the target dimensions that may not have been accurately scanned. For example, the target dimensions that could not be determined by the scan of the 3D object may be displayed, such as the depth of a hole or other feature of an 3D object that could not be determined by the scan of the 3D object. Further, a user may have the option to limit the display of the target dimensions to the target dimensions that may not have been accurately scanned.

Displaying information related to the ranked target dimensions may include displaying the ranked target dimensions based on the type of 3D object. For example, a 3D object may include a hole and a pin that fits into the hole, where the hole may be deeper than the length of the pin. The length of the pin may not be deemed an important target dimension because of the type of 3D object, such as a 3D object with a hole deeper than the length of the pin, and as such may not be displayed.

Displaying information related to the ranked target dimensions may include projecting, by a projected light, information relating to the ranked target dimensions onto the 3D object. For example, the scanner may be a structured light scanner that projects a pattern of light onto the 3D object, where the structured light scanner includes a turn table onto which the scanned 3D object may be placed. The turn table may be a mechanically operated device that rotates the object by a specified angle. The same scanner used for scanning may be used to project, by a pattern of light, information related to the ranked target dimensions onto the 3D object.

Using the projected pattern of light, the scanner may project the ranked target dimensions onto the corresponding areas of the 3D object. For example, a 3D object comprised of two cylinders may have a ranked target dimension that includes the diameter of a first of the two cylinders of the 3D object; the scanner may project onto the first of the two cylinders an indication to measure the diameter of the first of the two cylinders via a projected light pattern. Additionally, the scanner may rotate the 3D object via the turn table in order to project the indication onto the second of the two cylinders. The 3D object may be rotated when the orientation of the 3D object relative to the scanner may not align to properly project the light pattern onto the correct corresponding area of the object.

As illustrated at 346, the method 334 can include receiving a measured value of a dimension of the 3D object from a measurement tool. For example, once information relating to the ranked target dimensions of the 3D object are displayed to indicate to a user dimensions of the 3D object to be measured, the user may measure dimensions of the 3D object to supplement values of dimensions of the 3D model using a measurement tool.

As used herein, a measurement tool may be a tool to make a measurement of a dimension of the 3D object. That is, a measurement tool may include a mechanism to directly measure a dimension of the 3D object, or to indicate a desired dimension of the 3D object. A measurement tool may include a micrometer, caliper, protractor, and/or tape measure, although examples of the disclosure are not so limited.

The measurement tool may include a mechanism to indicate a dimension of the 3D object when the dimension may not be able to be directly measured on the 3D object. In some examples, a micrometer may be set by the user to show a desired wall thickness even if the wall thickness may not be measured with available measurement tools. In some examples, the length of the 3D object could be indicated by a user moving a caliper to the desired length even if the 3D object is not present. That is, the measurement tool may be used to indicate a desired dimension of the 3D object without having the 3D object present.

The measurement from the measurement tool can be transmitted (e.g., to a computing device, such as computing device 216) by a network relationship. For example, the measurement can be transmitted to a computing device from the measurement tool via a wired or wireless network.

The wired or wireless network can be a network relationship that connects the measurement tool to the computing device. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, a Bluetooth network, and/or the Internet, among other types of network relationships.

As illustrated at 348, the method 334 can include determining a dimension of the 3D model that corresponds to the measured value of the dimension of the 3D object from the measurement tool. For example, once a measurement of the 3D object is received from the measurement tool, the computing device may not know which dimension of the 3D object the measurement corresponds to. That is, the user may not have measured the highest ranked target dimension, and so applying the measurement to the highest ranked target dimension of the 3D model may result in an incorrect 3D model of the 3D object.

The value of the dimension of the 3D model that corresponds to the measured value of the dimension of the 3D object from the measurement tool may be determined using the ranked target dimensions. For example, it may be more plausible that the user has measured the highest ranked target dimension displayed as part of the information relating to the ranked target dimensions of the 3D object. A probability that the measured dimension from the measurement tool corresponds to the highest ranked target dimension can be assigned. Further, other measurements received from the measurement tool can additionally be assigned probabilities that correspond to other ranked target dimensions.

Determining a probability that each measurement corresponds to a particular ranked target dimension can include utilizing the measurement received from the measurement tool. Probabilities may be assigned to each dimension based on the size and type of measurement. For example, a 3D object may be approximately fifteen inches long and two inches wide; therefore, a measurement of fifteen inches received from a measurement tool may be more probable to correspond to a length of the 3D object than the width of the 3D object.

Determining the dimension of the 3D model that corresponds to the value of the measured dimension of the 3D object may include using a camera to determine a location of the measurement tool relative to the 3D object. For example, the scanner may include a plurality of cameras that may track movement of a measurement tool relative to the 3D object. A 3D cylindrical object may be approximately two inches long and having a diameter of approximately two inches may be measured using a measurement tool and the measurement process may be tracked using the camera. A measurement of 2.1 inches may be received, and using the camera to determine the placement of the measurement tool relative to the 3D object, the measurement can be determined to be the length of the cylinder based on the camera capturing the placement of the measurement tool relative to the 3D object during the measurement.

Determining the dimension of the 3D model that corresponds to the value of the measured dimension of the 3D object may include using a sensor to determine a location and/or orientation of the measurement tool. For example, the measurement tool may include an orientation sensor. If the orientation sensor determines the measurement tool is being held horizontally, and a target dimension exists which is horizontal on the image of the 3D object displayed to the user, then the measurement may be determined to be of the target dimension corresponding to the horizontal dimension.

As illustrated at 350, the method 334 can include updating a value of the dimension of the 3D model corresponding to the measured value of the dimension of the 3D object. For example, the 3D model can be updated with the received measured value of the dimension of the 3D object to supplement the initial scan of the 3D object.

In some examples, the computing device may determine a particular dimension of the 3D model corresponds to a measured dimension and update the 3D model with the measured dimension. For example, the computing device may determine a measured dimension received from a measurement tool corresponds to a particular dimension of the 3D model based on the value of the measured dimension of the 3D object as well as the ranked target dimensions. The computing device may update (e.g., automatically) the particular dimension of the 3D model with the measured dimension.

In some examples, the computing device may request a selection, via a display, for a user to select the dimension of the 3D model corresponding to the measured dimension of the 3D object. For example, the computing device may request a user to select the dimension of the 3D model that corresponds to the dimension of the 3D object the user has measured. As another example, the computing device may select the most likely dimensions of the 3D object that correspond to the dimension of the 3D object the user has measured and request a user to select, from the most likely dimensions, the dimension of the 3D object that corresponds to the measured dimension.

The computing device may update a dimension of the 3D model of the 3D object corresponding to a measured dimension of the 3D object. For example, once a user has selected the dimension of the 3D model corresponding to the measured dimension (e.g., from either the entire list of dimensions of the 3D object or from the most likely dimensions of the 3D object as determined by the computing device), the dimension of the 3D model of the 3D object may be updated with the value of the received measurement.

Once a measured dimension of the 3D object is received and the 3D model of the 3D object is updated, the method 334 may be repeated. That is, method 334 may be repeated to further supplement the 3D model of the 3D object with further measurements received from a measurement tool. For example, upon updating the 3D model, the target dimensions may be re-ranked, updated information relating to the re-ranked target dimensions of the 3D object can be displayed, a further measured dimension of the 3D object can be received from a measurement tool, a dimension of the 3D model of the 3D object can be determined to correspond to the measured dimension, and the further dimension of the 3D model corresponding to the measured dimension can be updated.

In some examples, re-ranking the target dimension of the object may include optimizing the measurements to reduce the number of measurements utilized in supplementing the 3D model. For example, where a user is measuring a part that is two inches wide and three feet long with small one inch protrusions and the user takes a measurement of the protrusions, the computing device may determine the user is using a measurement tool such as a caliper with a low range of measurement (e.g., zero to twelve inches); the measurement tool may not be capable of measuring the length of the 3D object, so the computing device may request the user to measure the protrusions and the width rather than the length to prevent the user from having to switch measurement tools.

In some examples, method 334 may be utilized to generate a scaled 3D model relative to an original 3D object. For example, the original 3D object may be scanned using only photographs of the object. Lacking any object of known size in the photos, the relative measurements of the scan may be accurate but the absolute size of the object may be known approximately. Method 334 may be utilized to scan the original 3D object and request a user to measure a ranked target dimension. Once the measured dimension is received and correlated to the corresponding dimension in the 3D model of the 3D object, the computing device can scale the 3D model of the 3D object by scaling the dimension in the 3D model of the object corresponding to the received measured dimension, and then scaling the remaining dimensions of the 3D model of the 3D object accordingly.

Once a user is satisfied with a 3D model, the 3D model and user actions may be recorded and/or saved as historical scan information. The saved 3D model and user actions may be used to aid in analyzing and ranking subsequently scanned 3D objects.

As described herein, ranking target dimensions can supplement the scan of the 3D object using a measurement by a measurement tool to allow for more complete and accurate scans of 3D objects while minimizing time taken for a user to make necessary measurements to supplement the 3D model. Further, errors during the scan may be corrected to result in a more complete and accurate 3D model.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a plurality of" something can refer to one or more such things. For example, "a plurality of widgets" can refer to one or more widgets.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A system, comprising:
   a model engine to generate a three-dimensional (3D) model of an object from a scan of the object;
   an analysis engine to analyze the 3D model of the object and determine target dimensions of the object;
   a ranking engine to rank the target dimensions based on a probability of taking a supplemental measurement of the determined target dimensions, wherein the probability is based on target dimension characteristics, historical scan information related to the target dimension characteristics, or a combination thereof; and
   a display engine to display information relating to the ranked target dimensions of the object.

2. The system of claim 1, wherein the display engine is to display information related to a comparatively highest ranked target dimension of the target dimensions.

3. The system of claim 2, wherein a receiver engine is to receive a revised measured dimension of the object in response to receipt of a measurement of the highest ranked target dimension.

4. The system of claim 3, wherein the model engine updates the 3D model of the object with the revised measured dimension of the object in response to receipt of the measurement.

5. The system of claim 1, wherein the historical scan information includes scans and historical target dimensions of other scanned objects of a same object type.

6. The system of claim 1, wherein the ranking engine is to rank the target dimensions based on an estimated amount of time to measure the determined target dimensions for verification.

7. A non-transitory computer readable medium storing instructions executable by a processing resource to cause a computing device to:
   receive, from a scanner, a scan of a three-dimensional (3D) object;
   generate a 3D model of the 3D object from the scan;
   analyze the 3D model of the 3D object to determine target dimensions of the 3D object;
   rank the target dimensions based on a probability of taking a supplemental measurement of the determined target dimensions, wherein the probability is based on target dimension characteristics, historical scan information related to the target dimension characteristics, or a combination thereof; and
   display, via a user interface, information relating to the ranked target dimensions of the object.

8. The medium of claim 7, wherein displaying information includes displaying the 3D model.

9. The medium of claim 7, comprising instructions to receive a measured dimension of the 3D object from a measurement tool.

10. The medium of claim 9, comprising instructions to request a selection of a dimension of the 3D model corresponding to the measured dimension of the 3D object.

11. The medium of claim 9, comprising instructions to determine a dimension of the 3D model corresponding to the measured dimension of the 3D object using the ranked target dimensions.

12. The medium of claim 7, comprising instructions to update a value of a dimension of the 3D model of the 3D object to a measured value of a dimension of the 3D object.

13. The medium of claim 7, wherein displaying information includes displaying target dimensions of the 3D object that are inaccurately scanned by the scan of the 3D object.

14. A method, comprising:
   analyzing, at a computing device, a three-dimensional (3D) model of a 3D object to determine target dimensions of the 3D object;
   ranking, at the computing device, the target dimensions based on a probability of taking a supplemental measurement of the determined target dimensions, wherein the probability is based on target dimension characteristics, historical scan information related to the target dimension characteristics, or a combination thereof;

displaying information relating to the ranked target dimensions of the 3D object; receiving, at the computing device, a measured value of a dimension of the 3D object from a measurement tool;

determining a dimension of the 3D model that corresponds to the measured value of the dimension of the 3D object from the measurement tool; and updating a value of the dimension of the 3D model to the measured value of the dimension of the 3D object.

15. The method of claim 14, further including ranking the target dimensions based on a type of the 3D object.

16. The method of claim 14, wherein displaying information relating to the ranked target dimensions includes projecting, by a projected light, information relating to the ranked target dimensions onto the 3D object.

17. The method of claim 14, wherein determining the dimension of the 3D model that corresponds to the measured dimension of the 3D object includes using a camera to determine a location of the measurement tool relative to the 3D object.

18. The method of claim 14, wherein determining the dimension of the 3D model that corresponds to the measured dimension of the 3D object includes using a sensor to determine a location of the measurement tool relative to the 3D object.

19. The method of claim 14, wherein determining the dimension of the 3D model that corresponds to the measured dimension of the 3D object includes using a sensor to determine an orientation of the measurement tool relative to the 3D object.

20. The method of claim 14, wherein the method includes re-ranking, at the computing device, the target dimensions based on the updated value of the dimension of the 3D model.

* * * * *